United States Patent Office 3,618,370
Patented Nov. 9, 1971

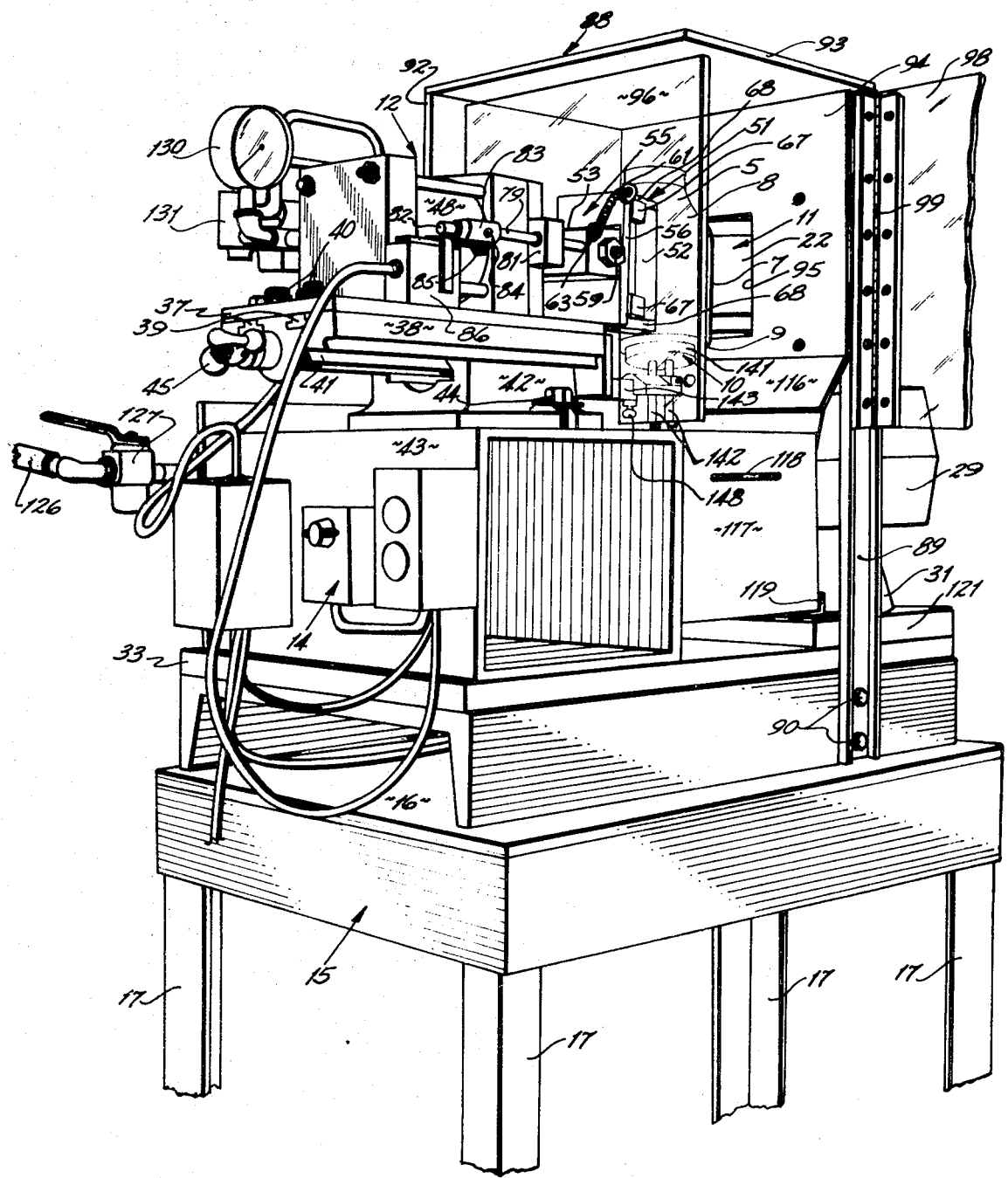

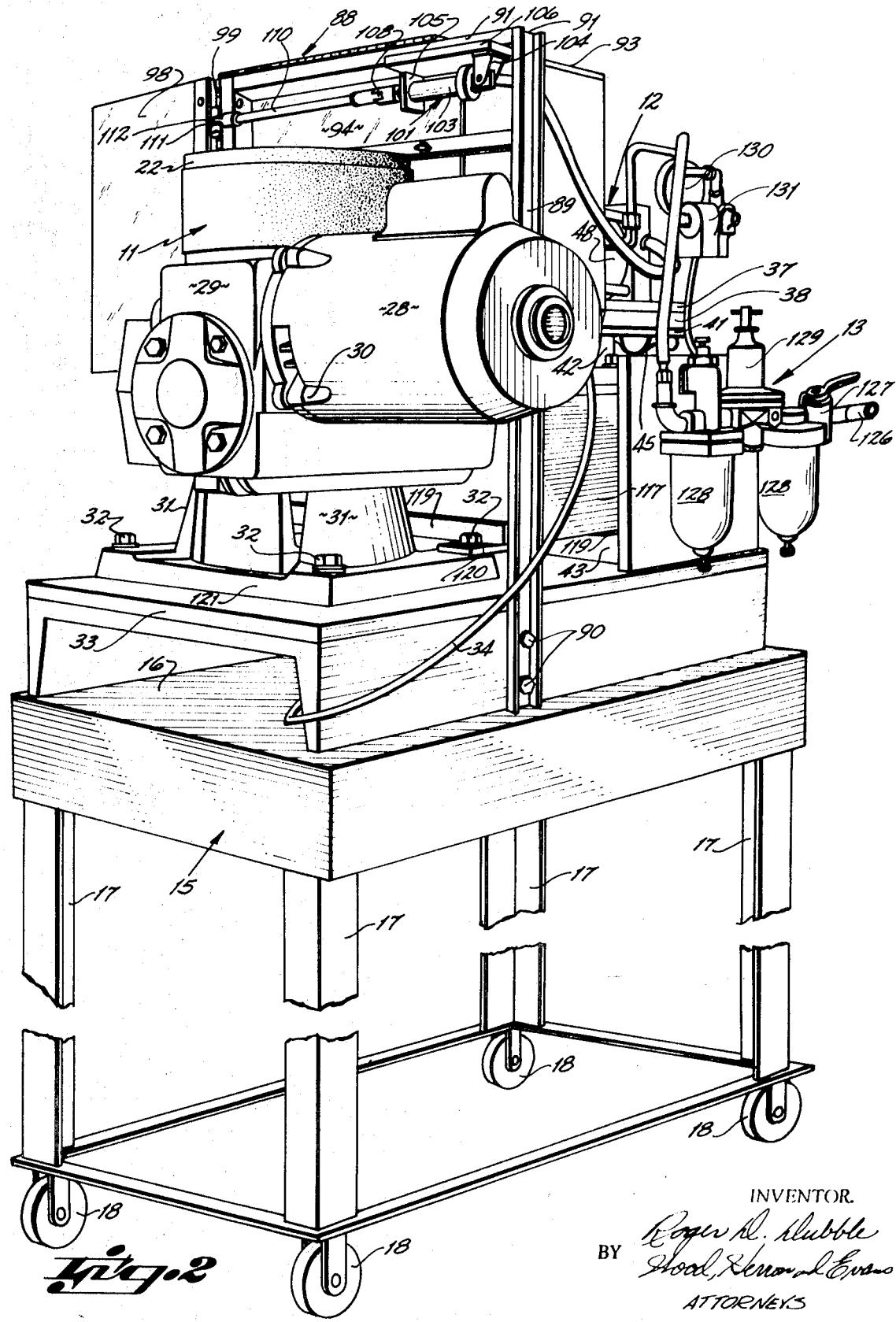

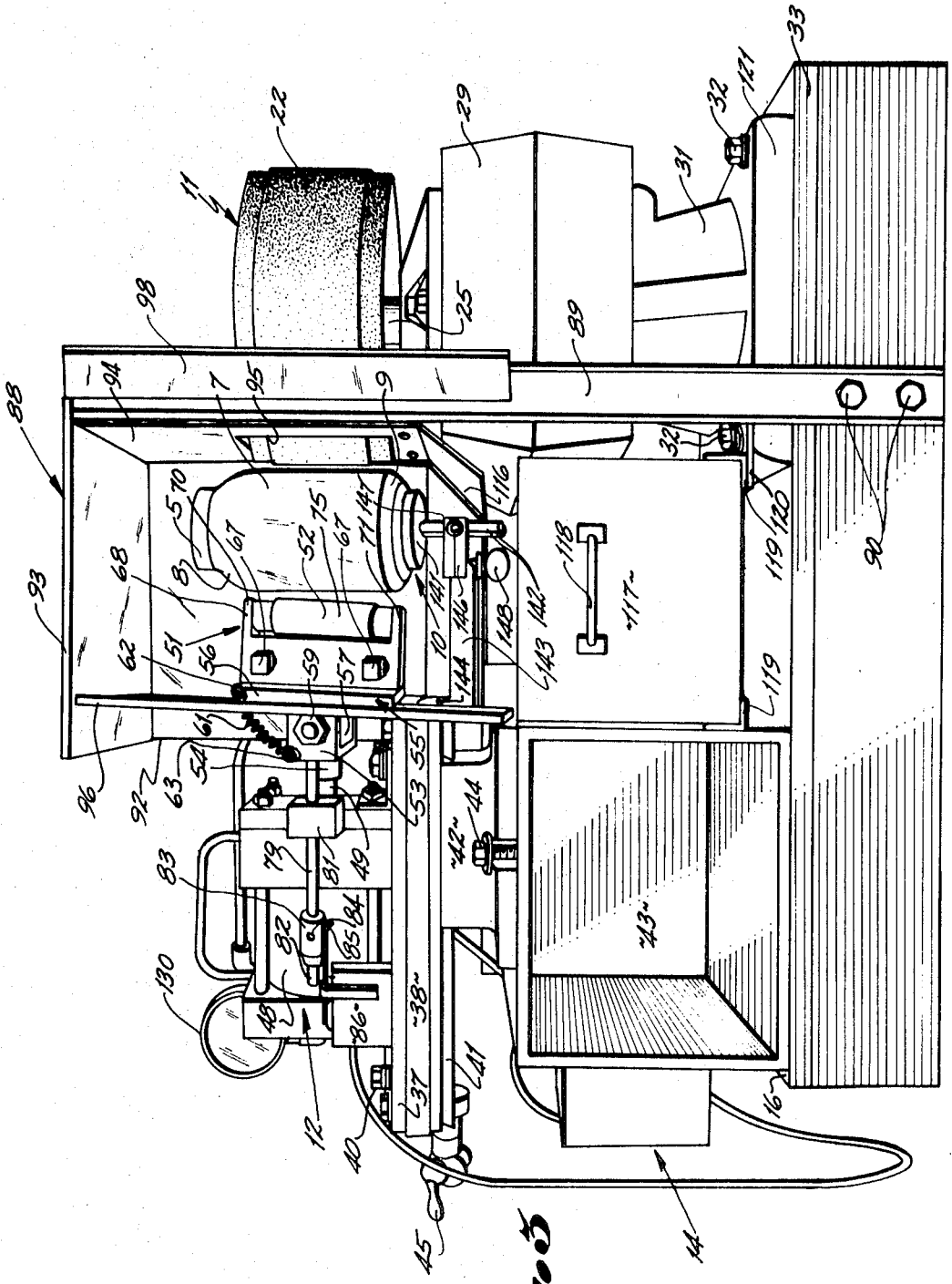

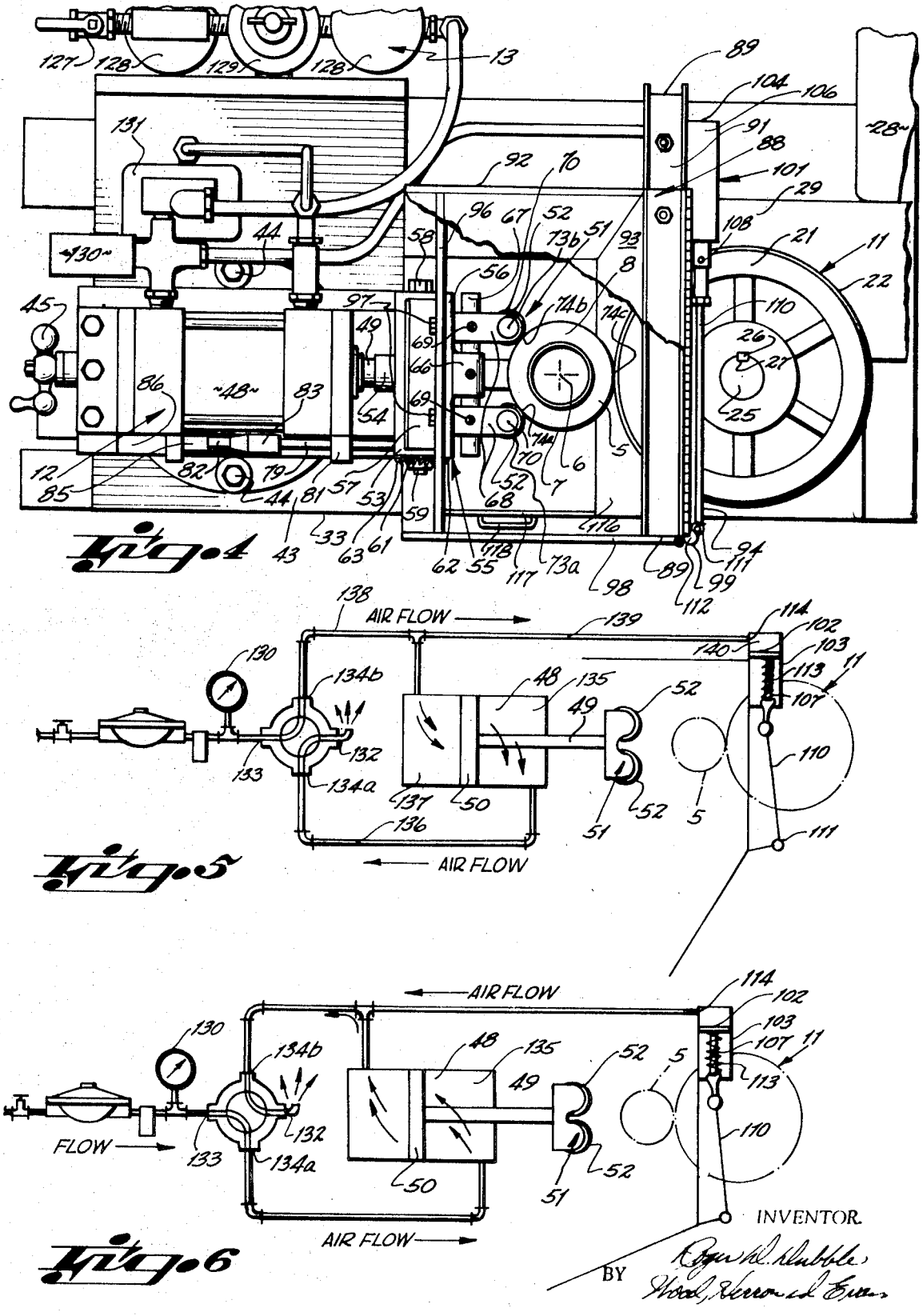

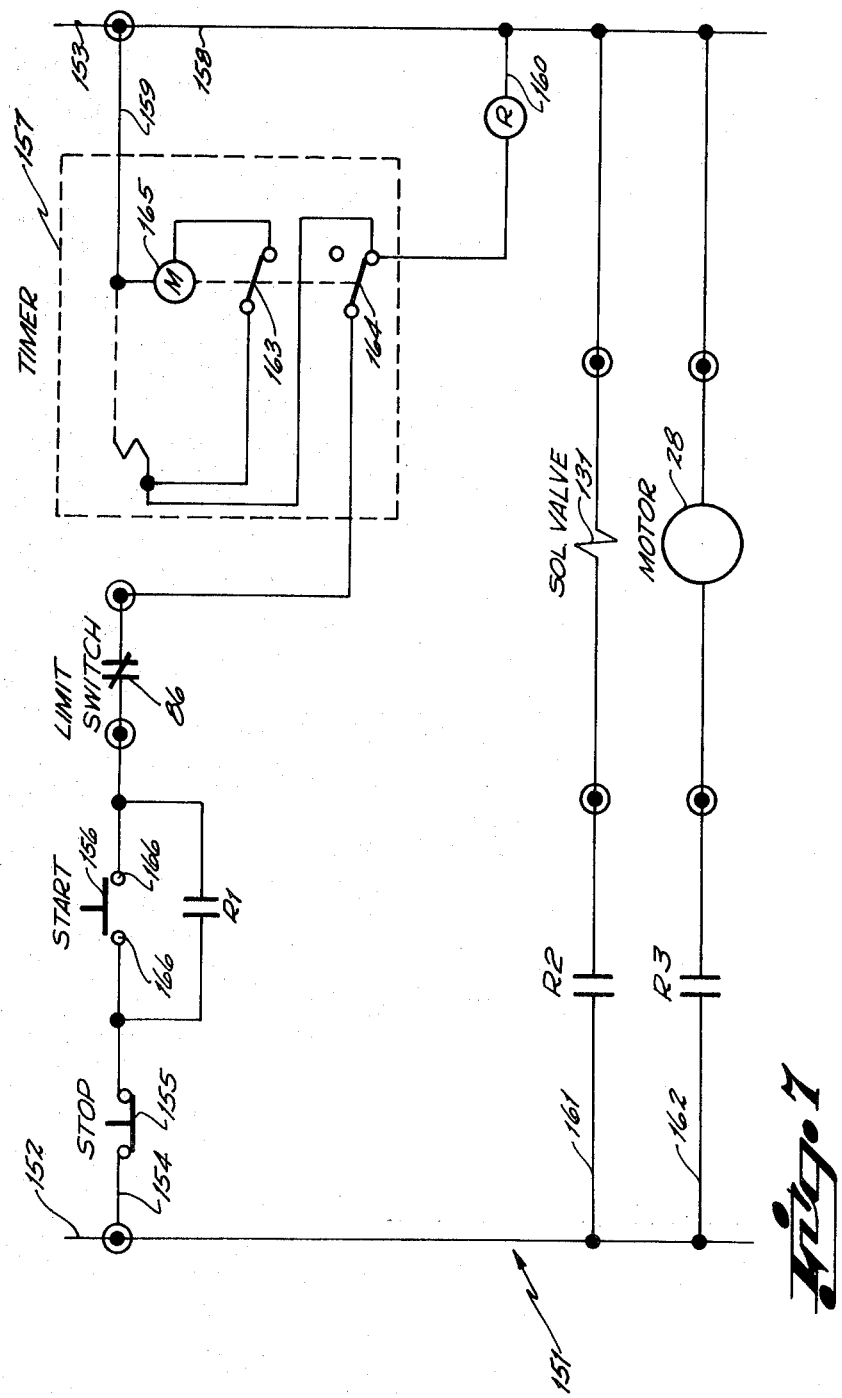

3,618,370
GLASS CONTAINER TEST APPARATUS
Roger D. Dubble, Lancaster, Ohio, assignor to Anchor Hocking Corporation, Lancaster, Ohio
Filed Oct. 14, 1969, Ser. No. 866,183
Int. Cl. G01d 21/00
U.S. Cl. 73—88 R    9 Claims

ABSTRACT OF THE DISCLOSURE

Test apparatus particularly adapted to determine the presence of blemishes or flaws or defects in the side wall of a glass container, which blemishes adversely affect the strength of the side wall. The test apparatus includes, in preferred form, a drive wheel of sufficient width to engage the container's side wall from shoulder to heel at one point on its periphery, and a yoke having an idler roller on each arm of sufficient length to engage the side walls from shoulder to heel at a second and a third point on its periphery, the three points being disposed about the container's periphery such that the container may be gripped therebetween during testing. Further, the test apparatus includes a device to control the force exerted on the container and a device to control the duration of container revolution at that force. Thus, the apparatus functions by controlled rotation of the glass container about its center axis for a preselected period while subjecting the side wall to a preselected and constant external load.

---

This invention relates to testing apparatus and, more particularly, relates to testing apparatus especially adapted to test the strength of the side wall of a glass container.

Glass containers of today must be strong enough, of course, to withstand normal wear and tear during their useful life. A glass container, as generally accepted in the trade, refers to such as bottles, jars and the like of both wide and narrow necks. Stresses are placed on a glass container at different times and under different conditions at all points in its life from immediately after manufacture through to ultimate discard. Stresses of major proportions are often placed on the container during its handling and shipping from the production facility to the filling facility, from the filling facility to the sales facility, and from the sales facility to consumer storage. Further, containers are subjected to substantial stresses during filling because of the requisite machine handling to optimize the filling step. Further, glass containers may well be subjected to substantial stresses at the sales facility because of the necessity of removing the containers from protective cartons and arranging them on display racks.

There is no generally accepted minimum standard of strength throughout the glass container industry which must be met to withstand the normal stresses and shocks that will be incurred during the useful lives of any container. Each manufacturer, however, normally has a minimum standard which he attempts to meet in the production of glass containers. It is generally accepted that a common measure of such strength is its impact strength; impact strength, therefore, is one of the main parameters available to a manufacturer in determining whether or not his product is meeting his minimum stress and shock resistance standards.

The wall thickness of glass containers is deigned so as to prevent wall breakage at certain stress levels. The strength of a glass container wall is related to the presence or absence of blemishes, i.e., flaws or defects, in both the inner and outer surface of the glass container's wall and to variations in wall thickness. The force level necessary to break a glass container wall is much less in that localized area of the wall having a blemish (such blemishes usually being microscopic) than in those areas of the wall with no blemish. Blemishes are usually caused by specks and/or dust sized particles of material that are primarily of a ferrous nature. The ferrous particles are generated or released by most all commercially available types of forming machines used in the manufacture of glass containers. When the ferrous particles, which are usually either metallic iron or black iron oxide, hit the inside or outside surface of a hot glass envelope during the forming step of a glass container, the particles fuse onto the surface of the wall to form the blemishes. Such blemishes are one of the major factors causing glass containers to have a low impact strength in localized areas in that when an extraneous force or shock is directed against that area of the container's wall having a blemish, the wall will tend to crack at a lower force level than when that same force is directed to a section of the wall having no such blemish. Of course, the more the blemishes on the inner and/or outer surface of the container's wall the greater the chance of an extraneous force impacting against a localized area having a blemish and, therefore, the greater the chance of the container breaking during its useful life.

Generally a manufacturer is concerned mainly with the testing of a glass container's side wall because the wall area other than the side wall, e.g., the bottom and the neck, is less prone to being subjected to high stresses and shocks during the container's useful life than is the side wall. Hence, test apparatus is required that provides a test for strength which stresses the inside and outside surface of the container's side wall so that any blemishes or imperfections on the inside or outside surface can be detected.

Prior to this invention, the standard testing equipment utilized in testing the strength of glass containers has been a pendulum type impact tester which tests the glass container's side wall for impact strength. The pendulum type impact tester provides a base on which the glass container is seated, and a pendulum positioned relative to the base so that the pendant engages the side wall of the container at the bottom of its swinging arc. An arcuate scale is mounted to cooperate with the pendulum for informing the operator that height to which the pendulum should be raised, prior to release, so as to maintain the minimum strength standard of, e.g., impact strength, desired for the given glass container being tested. Further, the pendulum may be affixed to a support stand which permits the contact point of the pendant with the container's side wall to be varied vertically relative to that side wall.

Thus, the pendulum type impact tester provides a pendant suspended from a fixed point so as to swing freely to and fro under the action of gravity, such a pendulum being similar to that commonly used in the regulation of clockwork movements. Knowing the weight of the pendant and the height from which it drops, an operator can then calculate the impact strength of that localized area of the glass container's wall which is impacted by the pendant. If the container does not break at that particular force level, that particular area of the container is considered as passing the test. However, because such a test only encompasses a very small area surrounding that point where the pendant of the tester impacts against the side wall of the container, the pendant must be adjusted to impact against and, thereby, to test, a second localized area, a third localized area, and so on of the container's side wall. It will be recalled that the main objective of an impact tester is to determine with accuracy the presence of blemishes on either the inner or outer surface of the glass container's wall, which imperfections lead to low wall strength. With the pendulum type impact tester each container must be impacted a couple of dozen times or more by the pendulum, each time in a different area of the container's side wall, to determine if the strength level desired is present in that container.

It is difficult to impact the entire surface area of the container's side walls; thus, one disadvantage of the pendulum type impact tester is its inability to test quickly the entire surface area of the container's side wall. Further, it is generally not possible to determine by eye where blemishes are because the blemishes are usually microscopic. This gives rise to the problem of finding that blemished area in the first instance. Even when the blemish is found there still remains the problem of adjusting the pendulum arc so that the pendant impacts the blemish over that localized area of the wall where that blemish occurs. For example, impacting the side wall ony 1/16 inch removed from the blemish may not affect that wall area weakened by the blemish. Therefore, with the pendulum type impact tester the probability of actually impacting the container's side wall with the pendant at that point where an actual weakness or blemish occurs must depend on the impacting of the container in a number of different places. Further, it will be readily apparent that to test a single glass container utilizing the pendulum type impact tester takes a substantial period of time, for example, on the order of three to five minutes or more by a skilled operator. Such a lengthy testing time increases the container forming process inefficiency and cost because there is a relatively long time gap between testing the container and making any equipment adjustments dictated by the impact strength test results. This has deferred use of the standard pendulum type impact tester as an on-line test in the commercial production of glass containers.

Hence, it has been one objective of this invention to provide container test apparatus which can be utilized as an on-line quality control tool to act as a warning device and quickly inform the operator of glass container forming equipment when the process is out of control from a side wall strength specification standpoint, as well as to act as a research tool to test the quality of glass composition, container design, and container geometry for their effects on side wall strength.

It has been another objective of this invention to provide container test apparatus adapted to test glass containers for strength, the results of which can be directly correlated with impact strength as determined by a pendulum type impact tester, that provides increased operating efficiency and reliability over the pendulum type impact tester known to the prior art. Such opertaing efficiency is optimized with the container test apparatus of this invention (a) because the reliability of the results is greatly increased since the total area of glass container's side wall may be tested if desired to produce stresses throughout the entire wall area that are substantially equal to those stresses developed by a pendulum type impact tester in just a series of highly localized areas and (b) because the results of this test, which is a strength test the results of which can be converted to results equivalent to those obtained from a pendulum type impact tester, are available within seconds through the use of this apparatus.

Other objectives and advantages of the invention will be more apparent from the following detailed description taken in conjunction with the drawings in which:

FIG. 1 is a front-corner perspective view taken from one end of the container test apparatus of this invention;

FIG. 2 is a partially cut away, rear-corner perspective view taken from the other end of the container test apparatus;

FIG. 3 is a front perspective view taken from the front of the container test apparatus;

FIG. 4 is a partially cut away top view of the container test apparatus;

FIG. 5 is a schematic diagram illustrating the attitude of the apparatus' pneumatic system during testing of a container;

FIG. 6 is a view similar to FIG. 5 illustrating the attitude of the apparatus' pneumatic system during shutdown, and FIG. 7 is a schematic view illustrating the apparatus' electrical circuit for controlling the sequence of steps performed.

As illustrated in FIGS. 1–3, the preferred container test apparatus of this invention comprises means 10 for supporting a glass container 5 in operable or testing position, drive means 11 for rotating the container about its axis 6, pressure or force applying means 12 engageable with the container's side wall 7 for applying force against the side wall to create a stress in that side wall as the container rotates about its axis, regulator means 13 connected to the pressure means to permit adjustment of the force supplied by the pressure means, and control means 14 connected with the drive means to control the number of revolutions of the container once the force applied to it by the pressure means reaches a predetermined desired level. The glass container 5 shown in the accompanying drawing is in the nature of a mayonnaise size jar, but it will be apparent that the apparatus may be adapted to many different container sizes from, e.g., a baby food jar, to, e.g., a gallon jug.

The container test apparatus is mounted on a cart 15 having a table top 16 supported by corner struts 17, caster type wheels 18 being mounted to the bottom ends of the struts so that the table can be moved from position to position as desired. The cart 15 structure permits the bottle testing apparatus to be easily transported from a quality control laboratory to a production area or vice versa, as well as from production line to production line within a production area, so that efficient use of the container test apparatus can be achieved.

The drive means 11 for rotating a glass container, shown in the drawings as a bottle 5, about its axis 6 includes a drive wheel 21 with tire 22 that is connected to a center hub 23 by spokes 24, see FIG. 4. The tire 22 is fabricated of a relatively flexible, high friction coefficient material such as rubber to provide a cushioned face for the drive wheel 21. Basically, the tire 22 only need be flat enough and wide enough to provide good driving contact of the drive wheel 21 with the bottle, however, the width of the tire 22 is preferably of a width sufficient to permit the tire to extend substantially between the shoulder 8 and the heel 9 of the glass bottle being tested at any given point on the periphery of the bottle. Further, it is preferred that the drive wheel 21 be of a diameter no smaller than the diameter of the largest bottle to be tested on the apparatus.

The drive wheel 21 is fixed to drive shaft 25 through key 26 and keyway 27, see FIG. 4. The drive shaft 25 is rotated by motor 28 through gear reducer 29, the motor and gear reducer being of a relatively heavy duty type because of the pressures to be exerted and withstood under operating conditions. The motor 28 is directly fixed to the gear reducer 29 through bolts 30, and the drive wheel 21 is also directly fixed to the gear reducer through drive shaft 25. The gear reducer 29 is carried on footing 31 which is bolted, as at 32, to a heavy duty stand 33 positioned on the table stop 16 of the portable cart 15. Power cord 34 leads from the motor to a suitable power source. As noted, the drive wheel 21 is fixed to the gear reducer 29 and, because the gear reducer is immobily mounted, the drive wheel is thus fixed in position from a vertical and horizontal movement standpoint although it is, of course, adapted for rotation.

The pressure means 12 engageable with the bottle's side wall 7 for applying force against that side wall, as the bottle is rotated by the drive wheel 21, is fixed to a mounting plate 37 carried on carriage 38, see FIGS. 1 and 3. The mounting plate 37 is connected with the carriage 38 by two blocks or runners 39 which are bolted, as at 40, to the mounting plate. The carriage 38 is slidably mounted, by means of slideway section 41, to a bed 42 that is fixed to a structural support member 43 through bolts 44. The member 43 is welded to heavy duty stand 33.

The carriage 38 is provided with a crank 45 fixed to a positioning screw, not shown, the screw being threadedly engaged with the bed 42 so that as the crank is rotated the carriage (with pressure means 12 fixed to the mounting plate 37) can be positioned and repositioned in a horizontal direction relative to the bottle's side wall 7. The construction of the carriage 38 and bed 42 may be of any type commonly known in the machine tool industry. The bed 42 and carriage 38 are positioned so that the horizontal path that the carriage traverses is aligned with the axis of rotation of the drive wheel 21 and the bottle's axis of rotation 6 so that the carriage moves readily relative to the drive wheel and the bottle 5. Such positioning means for the pressure means 12 permits the pressure means to be adjustably positioned relative to the drive wheel 21 depending on the diameter of the glass bottle 5 to be tested, the advantage of such positioning means being described further below.

The pressure means 12 is comprised of a pneumatic cylinder 48 fixed to mounting plate 37. The cylinder 48 is connected to cradler yoke 51, the yoke being adapted by means of the pneumatic cylinder to be moved into and out of pressure engaging relation with the side wall of a bottle in test position, see FIGS. 3 and 4. A piston rod 49 extends outwardly from the forward end of the cylinder 48, the rod being connected to a piston 50 (see FIGS. 5 and 6) within the cylinder. The cradler yoke 51 carries idler rolls 52 and is attached to the free end of the piston rod 49. The idler rolls 52 are also each provided with an outer tire 75 of a high coefficient of friction, e.g., rubber, which is usually of substantially the same width as the tire 22 on drive wheel 21, the widths of those tires 75, 22 being dependant on the height of side wall 7 of the bottle 5 under test so that preferably, substantially the entire surface area of the side wall is contacted during testing. Only an annular portion of the bottle's side wall intermediate its shoulder and heel may be tested if desired, however, simply by using a tire 75 width for the idler rolls 52 of a width less than the height of that side wall.

The cradler yoke 51 is comprised of a vertically positioned, channel-shaped structural member 53 which is mounted in fixed relation to the free end of piston rod 49 through collar 54, see FIG. 4. A support member 55, comprised of face plate 56 and bore block 57 fixed together, is pivotally connected to the channel shaped member 53 through the bore by means of nut 58 and bolt 59. These parts are sized so that the face plate 56 and, hence, idler rollers 52, can pivot in a limited arc in a vertical plane.

A tension spring 61 is located on each side of the cradler yoke 51, each tension spring being fixed at one end 62 to the top of the face plate 56 and at the other end 63 to the channel shaped member 53. Thus, the springs 61 cooperate to maintain the axis of the idler rollers 52 in a substantially vertical attitude when those rollers are not engaged with the side of a glass bottle, see FIG. 3. Without springs 61 the cradler yoke 51 would tend to drop substantially when not engaged with a bottle 5 because the bolt 59 permits pivotal movement of the face plate 56 relative to the channel shaped member 53; this, in turn, would cause the bottle 5 to be picked up off its support means 10 a substantial distance when idler rollers 52 ultimately were engaged with the sides of a bottle as the axis of the rollers 52 adjusted to a vertical attitude.

A collar 66 is attached to the front face of face plate 56, the collar supporting a top and bottom crossbar 67 in horizontal and fixed relation thereto, see FIGS. 3 and 4. On either side of the collar 66, and connected to the crossbars 67 which are square shaped in cross-sectional configuration, are two arms 68 each of which is slidably mounted on both the crossbars but is positionable at a fixed position relative thereto by means of set screws 69. Between the upper 70 and lower 71 hands of each arm 68 is carried the idler roller 52, the rollers 52 being mounted for free rotation relative to the hands between which each is supported.

A guide rod 79 is mounted to the channel shaped member 53 on one side of the yoke 51, the guide rod passing through a guide block 81 fixed to the front face block of the pneumatic cylinders 48, see FIGS. 1 and 4. The free end 82 of the guide rod 79 is provided with tripper in the form of a sleeve 83 that is adjustably positioned relative to that end 82 by means of a set screw 84. The sleeve 83 is adapted to cooperate with finger 85 of a limit switch 86 fixed to the mounting plate 37, the limit switch being adapted to stop drive wheel 21 and withdraw yoke 51 from the testing attitude if a bottle 5 breaks under test, as will be explained in further detail subsequently.

Thus, the axis of each of the idler rollers 52 is vertically positionable upon engagement of the yoke 51 with the bottle's side wall 7 because of the yoke's pivotal interconnection with the piston rod 49 and, therefore, each roller's axis is parallel to the axis 6 of the bottle during the bottle's rotation and parallel to the axis of rotation of the drive wheel 21. Further, the idler rolls 52 are adjustably positionable relative one to the other along crossbars 67 which permits their spacing to be adjusted depending on the diameter of the glass bottle to be tested. Preferably, the diameter of the idler rolls 52 is maintained small enough so that the center 73a to center 73b spacing between the idler rolls can be adjusted to permit contact on small glass jars, e.g., baby food jars, as well as on large glass jars, e.g., mayonnaise jars. The adjustability of the idler rolls 52 along crossbars 67, in addition to the relatively small diameter of the rolls 52 as compared to the drive wheel 21, cooperate in the adapting of the apparatus from big diameter bottles to small diameter bottles so that, in combination with the drive wheel 21, the bottle 5 under test is gripped at three points 74a, 74b and 74c in a triangular locking attitude during testing, see FIG. 4.

The general area of the bottle testing apparatus in which a glass bottle 5 is positioned during testing is provided with a housing 88 to protect an operator of the apparatus from possible flying glass upon breakage of the bottle, see FIGS. 1, 3 and 4. The housing 88 includes a support frame comprised of side legs 89 bolted to stand 33, as at 90, and top leg 91. A back plate 92, a top plate 93, and a first end plate 94 are mounted to legs 89, 91; thus, the plates 92–94 are all fixed relative to the stand 33. End plate 94 is provided with a hole 95 through which the drive wheel 21 extends so that the drive wheel can engage the side 7 of a glass bottle 5 being tested. These plates 92–94 are preferably of clear plastic so that the testing of the bottle can be observed by the operator. The other end of the housing 88 is provided with a second end plate 96 that is fixed to the face plate 56 of the yoke 51 by bolts 97, this end plate also preferably being of a clear plastic material. Because the end plate 96 is fixed to yoke 51, and because it is sized to fit within back plate 92 and top plate 93, end plate 96 of the housing 88 moves relative to the drive wheel 21 when the yoke 51 and carriage 38 are moved relative thereto by the crank 45, as well as when the yoke is moved relative thereto by the pneumatic cylinder 48.

The front face of the housing 88 is a door 98, preferably also formed of clear plastic, that is hingedly mounted, as at 99, to the front leg 89 of the housing 88 support frame, see FIGS. 2, and 4–6. The door 98 is pneumatically operated by the pneumatic cylinder 48 to coincide with operation of the yoke 51. This provides a safety feature for the bottle testing apparatus in that whenever the yoke 51 is moved into pressure engagement with the bottle under test, the door 98 is automatically shut so that the bottle is inaccessible to an operator. The door actuator mechanism 101 includes a spring urged piston having a head 102 within a pneumatic cylinder 103, the cylinder being carried between end plates 104, 105 that are connected to the housing 88 support frame through mounting plate 106 fixed to top leg 91 of the support frame, see FIG. 2. The piston rod 107, attached to the piston head 102 at one end, is pivotally connected, as at 108, at its free end to one end of a connector rod 110. The other end of the connector rod 110 is pivotally connected, as at 111, to an ear 112 extending out from and mounted to the door 98. Spring 113 within the cylinder 103 is positioned to continuously urge the piston head 102 toward the rear of the cylinder and, thereby continually urge the door 98 toward the open position, see FIGS. 5 and 6. The pneumatic piping provided the cylinder 102 is such that a charge of air reaching the cylinder through inlet port 114 forces the piston head 102 against the spring 113 to close the door and maintain it closed as long as air pressure is available. As soon as the charge of air is released, spring 113 urges piston head in an opposite direction to open the door 98.

Deflector plates 116, which also form part of the housing 88, are fixed to the back plate 92 and the first end plate 94 to direct any broken glass into a storage drawer 117 directly positioned beneath the housing 88, see FIGS. 1, 3 and 4. The storage drawer 117 is provided with a handle 118 and is movable on parallel rails 119, one of the rails being fixed to the member 43 and the other of the rails being fixed to ears 120 mounted to the footing 121 of gear reducer 29. Whenever a bottle breaks the fragments will be accumulated in the drawer 117 and will be available for analysis to determine the cause of failure or, if breakage analyses are not desired, whenever the drawer 117 becomes full or partially full of broken glass, due to glass bottles broken during quality control tests, it need merely be pulled out from underneath the housing 88 and emptied into a suitable cullet receptacle. Thus, the drawer 117, housing 88 and deflector plates 116 cooperate to provide apparatus for easily collecting glass fragments during research tests so that subsequent testing to determine the flaws or defects causing the low bottle strength, e.g., by fracture analysis, may be performed. Alternatively, the broken glass pieces may drop directly into a cullet chute.

The pneumatic system by means of which the yoke 51 and door 98 to the housing 88 are operated is particularly illustrated in FIGS. 2, 5 and 6. The system includes an air line 126 with an off-on valve 127 connected to an air pressure source, not shown. Downstream from the valve 127 is positioned a pair of air cleaners 128 with a pressure regulator 129 therebetween. A pressure gauge 130 is positioned in the air line 126 downstream from the pressure regulator 129 and air cleaners 128 may be of any type commercially available. Further downstream the air line 126 is connected to a four-way solenoid valve 131, the valve having outlet port 132, opposite the air pressure inlet port 133, vented to the atmosphere. One of the two ports 134a between the inlet port 133 and vent port 132 is connected to the rod end 135 of yoke cylinder 48 through vent line 136. The other of the ports 134b is connected to the head end 137 of cylinder 48 through pressure line 138, the pressure line 138 also being connected with a branch line 139 which interconnects with the head end 140 of the door cylinder 103.

In the bottle test attitude, as illustrated in FIG. 5, the solenoid valve 131 is positioned so that high pressure air flows to the head end 137 of the yoke cylinder 48 to force the yoke 51 toward the bottle 5 under test and to provide high pressure air against the head 102 of door cylinder 103 to close the door 98 to the housing 88 surrounding the bottle under test. In this test attitude the rod end 135 of yoke cylinder 48 is vented to the atmosphere through line 136. In the non-test or shutdown attitude, as illustrated in FIG. 6, the solenoid valve 131 is positioned so that the rod end 135 of the yoke cylinder 48 is pressurized to positively withdraw the yoke 51 from, and to maintain the yoke 51 from, testing position, i.e., from engagement with the bottle under test. Further, in this non-test attitude the head end 137 of the yoke cylinder 48 is vented to the atmosphere through line 138 and the door cylinder 103 is also vented to the atmosphere through lines 138, 139. Upon venting the door cylinder 102 to atmosphere the force exerted by spring 113 overcomes the air pressure, now released, within the cylinder acting on head 102 and, thereby, opens the door 98 to the housing 88 surrounding the bottle 5 under test.

Means in the form of an adjustable table 141 is also provided for supporting the bottle to be tested in testing position before it is gripped between drive wheel 21 and yoke 51, see FIG. 3. The table 141 is circular and is mounted to posts 142 that are carried on the end of an arm 143, the arm being fixed to the carriage 38 through plate 144. Thus, as the pressure means 12 fixed on carriage 38 is moved relative to the drive wheel 21 by means of the crank 45, the table 141 also moves relative thereto. For positioning the table in the desired spatial relation between the drive wheel 21 and idler rolls 52 there is provided structure that includes the two depending posts 142 which support table 141. These posts 142 cooperate with block 146 mounted to the arm 143, the vertical position of the table 141 being adjustable by means of set screw 147 in that block 146 which cooperates with the posts supporting the table; such an adjustment permits vertical positioning of the bottle 5 within the testing apparatus depending on the height of the bottle being tested. Further, the block 146 is slidably mounted on the arm 143 and may be maintained at a preselected position thereon by means of thumb screw 148. Thus, the support table 141 may be positioned both vertically and horizontally to permit its position to be adjusted to adapt to the diameter, as well as with the height of the glass bottle being tested.

The control means 14 connected to the drive means 11 (by which the number of revolutions of the bottle 5 is controlled once the force applied from the pressure means 12 reaches a predetermined level) is incorporated in a relay control circuit 151 illustrated in FIG. 7. That circuit is in the nature of a ladder circuit having main leads 152 and 153. The top cross lead 154 of the circuit includes a manually actuated stop button 155, a manually actuated start button 156 with a relay contact R1 in parallel, the limit switch 86, and an automatic reset timer 157. Reset timer 157 is connected to side lead 158 by branch leads 159, 160, with branch lead 160 incorporating relay R. The middle cross lead 161 of the ladder circuit includes relay contact R2 and the solenoid valve 131. The bottom cross lead 162 of the ladder circuit includes relay contacts R3 and the drive motor 28. The contacts R1, R2 and R3 are normally open contacts which close when energized.

In normal operation of the circuit, i.e., when no breakage of the bottle under test occurs, a testing cycle time is selected and preset by means of the timer 157 to close the timer switches 163, 164, the timer being controlled by motor 165 in the timer's circuit. When it is desired to start the bottle testing apparatus the start button 156 is depressed to engage contacts 166, the start button thereafter springing open (it being spring biased open) as soon as the contacts 166 are engaged. The closing of contacts 166 by the start button 156 closes the relay R which, in turn, causes the normally open relay contacts R1, R2 and R3 to close and energize the circuit. Thus, the circuit becomes a holding type circuit until thereafter broken by limit switch 86, by the completion of the time cycle as governed by timer 157, or by stop button 155.

Once the circuit is energized the solenoid valve 131 is energized into that attitude illustrated in FIG. 5 and the motor 78 is also energized. Upon reaching the end of the prescribed time limit as set on the automatic reset timer 157, switch 163 opens to stop the timer and switch 164 opens to deenergize the circuit, thereby stopping the motor 78 and permitting the solenoid 131 to return to the shutdown attitude illustrated in FIG. 6. Also, relay R is deenergized and the relay contacts R1, R2 and R3 open when the circuit is broken. If the bottle breaks during the test, limit switch 86 breaks the circuit instead of reset timer 157. Further, if it is desired to stop operation of the apparatus during testing, stop button 155 is manually depressed to break the circuit.

In operation of the bottle testing apparatus of this invention, the pressure regulator 129 is preset to provide a desired level of force to be exerted by yoke 51 against bottle 5 when the bottle is in testing position as illustrated in FIG. 4. The force level exerted is, of course, related to the compressed air pressure indicated on the pressure gauge 130. Different bottle geometries, different wall thicknesses and different glass compositions are all taken into consideration in selecting the force level desired when testing for a minimum acceptable side wall strength for the glass container under test. For example, and generally speaking, the larger the bottle diameter for a given side wall thickness and height, the lower will be the force level required to achieve a given stress level in the bottle's side wall. Generally speaking, the pressure to be exerted on the side wall of the bottle under test will run in the neighborhood of 20-40 p.s.i. but may, of course, be varied up or down as desired.

Further, the table 141 is positioned vertically by means of set screw 147 and horizontally by means of thumb screw 148 so that the bottle 5 can be inserted and maintained in the housing 88 a desired spatial relation with the drive wheel 21 and idler rollers 52 prior to testing, as well as subsequent to testing (before the bottle is removed from the testing position) if the bottle has not broken during testing.

Additionally, the position of the yoke 51 in the non-test attitude, see FIGS. 3 and 6, is preferably such that the gap between the idler roller tires 75 and the bottle's side wall 7, assuming the side wall is juxtaposed to drive wheel 21, is on the order of about one inch. This for the reason that such a distance permits easy insertion of the bottle 5 onto the table 141 prior to test, as well as prevents an undue length of stroke for the yoke 51 from the home position (illustrated in FIGS. 3 and 6) to the testing position (illustrated in FIGS. 4 and 5). The longer the length of the stroke required for the yoke 51 the further the delay in moving the yoke into contact with the bottle's side wall as the test is commenced. Further, a short stroke provides a cushioning type of impact of the idler rollers 52 against the bottle's side walls as the yoke 51 is moved by pressure means 12 from the non-test attitude of FIG. 3 to the test attitude of FIG. 4. The crank 45 is provided with a suitable indexing mechanism or scale, not shown, so that the position of the carriage 38 (and, hence, the idler rollers 52) relative to the bottle's side wall 7 when in the non-test attitude can be easily changed when the dimensions of the bottle under test is changed. When the test apparatus is adapted to test, for example, a baby food jar of about two inches in diameter, after having tested, for example, a mayonnaise jar of about 5 inches diameter, the pressure means 12 can be easily and reproducibly adjusted by the crank 45 and scale to maintain the approximate one inch stroke between idler rollers 52 and the bottle 5.

The timer 157 is then set for a desired time period. This time period is directly related to the peripheral dimension of the bottles to be tested. It is most desirable to set the timer for a time period sufficient to permit the drive wheel 21 to rotate the bottle 5 under test for one revolution under maximum pressure load, thereby causing each and every portion of the side wall area of the bottle to be exposed to the maximum force level during the test. Generally speaking, the timer 157 will be set so that something greater than one revolution will result because of the time lag between circuit energization which starts drive wheel 21 and moves solenoid 131 to the testing attitude, and the actual positioning of yoke 51 in engagement with the bottle's side wall 7 at the desired pressure. The drive wheel 21, of course, starts to rotate as soon as the circuit is energized. Although two or more revolutions may be made at the maximum forces level, excess revolutions are usually not any more useful than a single revolution. Such a timer setting may be initially ascertained for a given bottle geometry by trial and error.

The relationship of the air pressure (and, hence, the force level exerted against the bottle's side wall (to the length of contact of the drive wheel 21 on the bottle's side wall 7 at any given point in its periphery is important in the sense that through such a relationship the strength test results of the test apparatus of this invention can be definitely correlated with the strength test results of the pendulum type impact tester of the prior art; for example, the strength test results using the test apparatus of this invention may be converted to results in terms of impact strength. Because the speed of drive wheel 21 is constant the time that a bottle's side wall 7 is under maximum stress is constant at any given point on that side wall's periphery. Generally speaking, a relatively low stress for a relatively long period of time, such as achieved with the test apparatus of this invention, is equal to a relatively high stress for a relatively short period of time, such as achieved with the pendulum type impact tester. The pendulum type impact tester may provide a stress duration for a time period on the order of thousandths of a second whereas the test apparatus of this invention provides a stress duration for a time on the order of tenths of a second. Therefore, even though the test apparatus of this invention makes use of a lesser stress load that load is exerted for a longer period of time so that the results using the novel apparatus of this invention are definitely correlatable with, and may be converted so as to be substantially equal to, the results of a pendulum type impact tester.

A bottle 5 is placed on table 141 and the test apparatus is now set for a testing cycle. To commence the testing cycle, start button 156 is depressed by an operator which begins an automatic sequence of the testing cycle steps performed by the apparatus from beginning to end so that no further operator attention is required. Such a testing cycle takes only on the order of seconds to complete. Upon depressing the start button 156, the relay control circuit 151 is energized and the solenoid 131 is positioned as illustrated in FIG. 5 so that compressed air is directed into the head end 137 of the yoke cylinder 48. Once the head end 137 of the yoke cylinder 48 is exposed to the high pressure air, the yoke 51 is moved forward into engagement with the side 7 of the glass bottle 5 under test. The final pressure exerted by the cradling rollers 52 is substantially equal to that indicated by the air pressure gauge 130. Simultaneous with movement of the cradler rollers 52 into engagement with the side wall 7 of the glass bottle, the door 98 to the housing 88 surrounding the bottle under test is closed as compressed air is also directed against the piston head 102 of door cylinder 103, see FIG. 5. Further, the motor 78 is actuated to cause drive wheel 21 to rotate. Because the cradler rollers 52 exert pressure against the side wall 7 of the bottle 5 under test, and because the drive wheel 21 is drivingly engaged with a portion of the bottle's side wall opposite to that engaged by the cradler rolls, the bottle is rotated while pressure is exerted against the total side wall area between the shoulder 8 of the bottle and the heel 9 of the bottle. Further, the timer 157 is set to allow substantially one complete revolution of the bottle about its axis 6 of rotation after the maximum pressure to be exerted by the yoke 51 is achieved. Hence, there is no random testing of bottle's side wall as is the case with the pendulum type tester of the prior art. The entire surface area of the bottle's side wall is tested when the test apparatus of this invention is used.

If the bottle 5 breaks during revolution, the yoke 51 surges forward only a very limited extent because of the fact that collar 83 carried on guide rod 79 is removed from engagement with finger 85 of limit switch 86, thereby instantaneously deenergizing the relay control circuit 151 which, in turn deenergizes the motor 78 and switches the solenoid valve 131 from the testing attitude illustrated in FIG. 5 to the shutdown attitude illustrated in FIG. 6. This provides a safety feature in the equipment which effectively prevents any undue structural harm to come to the equipment due to extended surging of the yoke 51 when the bottle breaks which would drive glass fragments into the several roll faces. Further, if the bottle 5 breaks the glass is restrained within an environment closely related to that area where the bottle is undergoing test by means of the clear walled housing 88, the glass falling into the drawer 117 positioned beneath the testing area.

Upon completion of the testing cycle, whether by limit switch 86 or by virtue of the timer 157 having completed its time cycle or by manual stop button 155, the relay control circuit 151 is broken. Breaking of the relay control circuit 151 stops the motor 78 and transforms the solenoid valve 131 into the shutdown attitude illustrated in FIG. 6. This causes compressed air to flow into the rod end 135 of the yoke cylinder 48 to retract the yoke and opens the high pressure side of the door cylinder 103 to vent so that the door 98 opens by spring 113 action. If the bottle 5 is not broken, it is removed from the table support means and a new bottle inserted.

What I desire to claim and protect by Letters Patent is:

1. Test apparatus particularly adapted to test the strength of a glass container's sidewall comprising
    drive means for rotating the container about its center axis,
    force applying means engageable with container's sidewall for applying an extraneous force against the outside surface of said sidewall as the container is rotated about its axis,
    regulator means connected to said force applying means for providing adjustability of said force,
    and control means for establishing the duration of application of said force to said container while said container is being rotated about its axis,
    said drive means including a drive wheel adapted to engage the container's sidewall at one point on its periphery,
    said force applying means including a yoke presenting a pair of idler rollers adapted to engage the container's sidewall at a second and third point on its periphery, the three points being disposed about the container's periphery so that said container is gripped therebetween during testing,
    said yoke being selectively moveable between a test position whereat said idler rollers engage the container's sidewall in a force applying attitude and a home position whereat said idler rollers are retracted from engagement with the container's sidewall,
    said force applying means also including a penumatic system comprised of a pressure input line connectable with each side of a pressure cylinder, said yoke being mounted to the piston rod of said pressure cylinder, and a solenoid valve in said line selectively actuable to direct pressure air in one side or the other of said pressure cylinder,
    said regulator means including an air pressure regulator in said pressure line.

2. Test apparatus as set forth in claim 1 wherein said control means includes an electrical control circuit incorporating said solenoid valve, a drive motor for said drive wheel, and a timer connected with said drive motor, the number of revolutions of the container about its axis being controlled by said timer.

3. Test apparatus as set forth in claim 2 wherein said yoke further includes a tripper fixed thereto and wherein said control circuit further includes a limit switch, said limit switch being activated by said tripper only upon surging forward of said yoke when the container breaks during testing.

4. Test apparatus particularly adapted to test the strength of a glass container's sidewall comprising
    drive means for rotating the container about its center axis,
    force applying means engageable with the container's sidewall for applying an extraneous force against the outside surface of said sidewall as the container is rotated about its axis,
    regulator means connected to said force applying means for providing adjustability of said force,
    control means for establishing the duration of application of said force to said container while said container is being rotated about its axis,
    said drive means including a drive wheel adapted to engage the container's sidewall at one point on its periphery,
    said force applying means including a yoke presenting a pair of idler rollers adapted to engage the container's sidewall at a second and third point on its periphery, the three points being disposed about the container's periphery so that said container is gripped therebetween during testing.
    and selectively positionable table support means located relative to said drive wheel and said yoke for receiving a container to support same prior to the container's being gripped between said drive wheel and idler rollers during testing.

5. Test apparatus particularly adapted to test the strength of a glass container's sidewall comprising
    drive means for rotating the container about its center axis,
    force applying means engageable with the container's sidewall for applying an extraneous force against the outside surface of said sidewall as the container is rotated about its axis,
    regulator means connected to said force applying means for providing adjustability of said force,
    control means for establishing the duration of application of said force to said container while said container is being rotated about its axis,
    a housing substanitally surrounding the general apparatus area whereat the container is received and rotated during test, said housing being substantially open at the bottom thereof, and
    a cullet collector positioned beneath said housing to receive broken glass of those containers broken during test.

6. Test apparatus as set forth in claim 5 wherein said housing is provided with walls and a door, at least a portion of said housing being transparent, said door being interconnected with said force applying means so that upon activation of said force applying means at the start of a testing cycle said door is automatically closed and upon deactivation of said force applying means at the end of a testing cycle said door is automatically opened.

7. Test apparatus particularly adapted to test the strength of a glass container's sidewall comprising
    drive means for rotating the container about its center axis,
    pneumatically operated force applying means engageable with the container's sidewall for applying an extraneous force against the outside surface of said sidewall as the container is rotated about its axis,
    table support means for receiving the container to support same prior to the container's being gripped between said drive means and said force applying means during testing, and control means applying pressure air to said force applying means to move the latter from an inactive position spaced from a container on said table support means, into contact with said container and pressing said container against said drive means, maintaining force thereon for a predetermined period of time, and withdrawing said force applying means at the conclusion of said period of time, said control means being responsive to breaking of said container during said period of time and withdrawing said force applying means if said container breaks.

8. Test apparatus as set forth in claim 7 wherein said control means comprises a timer controlling duration of operation of said drive means and duration of application of force to said container by said force applying means.

9. Test apparatus particularly adapted to test the strength of a glass container's sidewall comprising drive means for rotating the container about its center axis, pneumatically operated force applying means engageable with the container's sidewall for applying an extraneous force against the outside surface of said sidewall as the container is rotated about its axis, table support means for receiving the container to support same prior to the container's being gripped between said drive means and said force applying means during testing, control means applying pressure air to said force applying means to move the latter from an inactive position spaced from a container on said table support means, into contact with said container and pressing said container against said drive means, maintaining force thereon for a predetermined period of time, and withdrawing said force applying means at the conclusion of said period of time, housing means surrounding the test area, said housing having a door, and means interconnecting said door and said control means such that said test is carried out only when said door is closed.

References Cited
UNITED STATES PATENTS

| | | | |
|---|---|---|---|
| 448,485 | 3/1891 | Hawkins | 101—7 |
| 2,625,098 | 1/1953 | Robbins et al. | 101—38 A |
| 2,856,058 | 10/1958 | Todd et al. | 101—38 R |

JERRY W. MYRACLE, Primary Examiner